United States Patent [19]

Kleeberg et al.

[11] Patent Number: 4,780,360

[45] Date of Patent: Oct. 25, 1988

[54] METHOD FOR MANUFACTURING ELECTRICAL INSULATING COMPOSITE MATERIALS

[75] Inventors: Wolfgang Kleeberg, Erlangen; Klaus-Robert Hauschildt; Heinz Hacker, both of Nürnberg, all of Fed. Rep. of Germany

[73] Assignee: Siemens Aktiengesellschaft, München, Fed. Rep. of Germany

[21] Appl. No.: 898,866

[22] Filed: Aug. 20, 1986

Related U.S. Application Data

[63] Continuation of Ser. No. 635,425, Jul. 30, 1984, abandoned.

[30] Foreign Application Priority Data

Jul. 29, 1983 [DE] Fed. Rep. of Germany ....... 3327711

[51] Int. Cl.$^4$ .................. B32B 27/04; C08G 59/68
[52] U.S. Cl. .................. 428/272; 428/290; 428/394; 428/395; 428/413; 427/386; 528/90; 528/93; 525/382; 525/423; 525/438; 525/504; 174/137 R
[58] Field of Search .......... 525/382, 423, 438, 504; 528/90, 93; 523/428; 427/386; 428/395, 413, 902, 290, 394, 272

[56] References Cited

U.S. PATENT DOCUMENTS

| | | | |
|---|---|---|---|
| 2,553,718 | 5/1951 | Newey et al. | 528/97 X |
| 2,977,332 | 3/1961 | Zumstein | 525/423 X |
| 3,424,795 | 1/1969 | Lund et al. | 525/382 X |
| 3,532,653 | 10/1970 | Smeal | 525/423 X |
| 3,934,067 | 1/1976 | Goldman et al. | 428/416 X |
| 4,022,946 | 5/1977 | Cummings | 427/386 X |
| 4,076,869 | 2/1978 | Flynn | 428/413 X |
| 4,237,149 | 12/1980 | Denk et al. | 427/386 X |
| 4,528,358 | 7/1985 | Kleeburg et al. | 528/93 X |

FOREIGN PATENT DOCUMENTS

0034309  8/1981  European Pat. Off. ........... 525/382

OTHER PUBLICATIONS

Narracott, "The Curing of Epoxide Resins", British Plastics, 26 (120-2), (1953).

Primary Examiner—Joseph L. Schofer
Assistant Examiner—F. M. Teskin
Attorney, Agent, or Firm—Kenyon & Kenyon

[57] ABSTRACT

Electrically insulating composite materials formed from (1) epoxy resins and (2) polymeric fiber reinforcement which have high strength are formed if the cross-linking of the epoxy resin is accomplished by anionic polymerization using tertiary amines of the formula

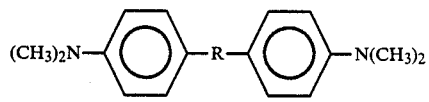

as catalyst.

22 Claims, No Drawings

METHOD FOR MANUFACTURING ELECTRICAL INSULATING COMPOSITE MATERIALS

This application is a continuation of application Ser. No. 635,425, filed July 30, 1984, abandoned.

BACKGROUND OF THE INVENTION

This invention relates to a method for manufacturing electrically insulating composite materials with a high specific modulus of elasticity and high dielectric strength, consisting of a cross-linked epoxy resin or epoxy resin mixture and a fiber reinforcement based on synthetic polymers.

In electrotechnology, insulating parts of high mechanical strength and low density in the form of composite materials are frequently required, e.g. laminates of a resin matrix and reinforcement fibers. This applies, for instance, to hollow-cylindered tie rods or plungers which are used in high-voltage circuit breakers, especially if switching gaps at high-voltage potential are to be switched by a drive at ground potential.

With switching gap distances of up to several meters, insulating tube materials with a small ratio of wall thickness to diameter are required in order to obtain advantageous physical dimensions while maintaining as low a weight as possible. Composite materials or laminates containing glass fibers and unsaturated polyester resins or glass fibers and epoxy polyaddition resins have an average density of 1.8 g cm$^{-3}$. By using synthetic polymer fiber materials, the laminate density can be reduced, on average, to 1.3 g cm$^{-3}$. Unfortunately, the advantages of such fibers, namely, low density and high tensile strength can not be utilized due to the lack of suitable impregnating resin systems.

Insulating tube materials and rods for high-voltage circuit breakers are known, for instance, from German Pat. No. 22 64 341 (see col. 1, lines 4 to 10) and DE-AS 24 29 475 (see col. 1, lines 3 to 21). In the manufacture of these tubes or rods a casting resin which is hardenable by polyaddition, usually an epoxy resin, is used. An insulating woven fabric material is embedded in the resin. These fabrics are sometimes made of plastic or glass fibers. The resulting compositions suffer from inadequate bonding between the resin and fiber components.

SUMMARY OF THE INVENTION

It is an object of this invention to develop a method for the manufacture of electrically insulating composite materials from cross-linked epoxy resins in such a manner that composite materials with higher strength and a higher modulus of elasticity are obtained.

According to the invention, this is achieved by the provision that the cross-linking of the epoxy resin takes place through anionic polymerization, by using tertiary amines of the general formula:

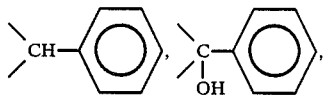

where R has the following meaning:
>CH$_2$, >CHOH, >CO, >CS, —O—, —S—, >SO$_2$,

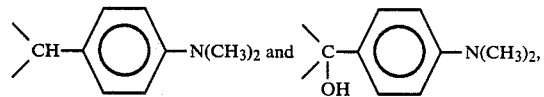

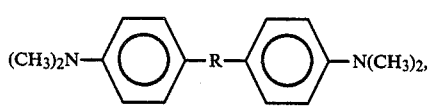

as a polymerization catalyst.

Surprisingly, it has been found that, in laminates of cross-linked epoxy resin with plastic fabric inserts, greater strength and a higher modulus of elasticity can be obtained if the cross-linking of the epoxy resin is anionically initiated with these catalysts. This is in contrast to the epoxy resins which are hardened in the known manner (see, for instance, German Pat. No. 22 64 341; col. 1, lines 4 to 6) by polyaddition with, for example, carboxylic acid anhydrides. The increase of the strength of the composite material formed by this method over those produced by conventional methods is up to 60% and the increase in the modulus of elasticity is 100% and more.

In the method according to the invention, 0.05 to 10 mass parts of polymerization catalyst are used per 100 mass parts of epoxy resin. Preferably, 0.1 to 5 mass parts of catalyst are used. Catalyst mixtures can also be used here, i.e., mixtures of tertiary amines of the type mentioned.

The synthetic polymer fiber reinforcements used in the method of this invention consist preferably of polyethyleneterephtalate and/or aromatic polyamides. However, other synthetic fibers with a high modulus of elasticity and polar structure may also be used. The fiber reinforcement can be in the form of woven or non-woven fabric or rovings.

In the method according to the invention, the following epoxy resins can be used to advantage: bisphenol-A-diglycidyl ether, bisphenol-F-diglycidyl ether, polyglycidyl ethers of phenol-formaldehyde or cresol-formaldehyde novolaks, hexahydrophtalic acid-diglycidyl esters, hydantoin epoxy resins, glycidyl isocyanurates such as triglycidyl isocyanurate, and urazol epoxies. Preferably, epoxy resin mixtures are used, i.e., mixtures of 2 or more epoxy resins.

The electrically insulating composite materials manufactured by the method according to the invention are suitable in particular as high strength laminates and for making switching rods for SF$_6$ circuit breakers.

DETAILED DESCRIPTION OF THE INVENTION

The invention will be explained in further detail and with the aid of the following examples.

The following woven fabrics were used for the fabrication of laminate test bodies:
(a) Mixed fabrics of aromatic polyamide and polyethylene-terephtalate (linen bonded, 7 warp threads/cm, 7 weft threads/cm, area weight: 174 g/m$^2$);
(b) Woven fabrics of a polyamide (linen bonding, 3 warp threads/cm, 12 weft threads/cm).

The test specimens were made from laminated sheets (180×110 mm$^2$) with a thickness of 3.2 mm (16 fabric layers) or 10 mm (55 fabric layers). The laminated sheets themselves were made in appropriate casting molds in accordance with conventional vacuum impregnating processes. The fabrics were predried for 20 hours at 100° C. and 3 mbar.

EXAMPLE 1

5 MT 4.4'-bis(dimethylamino)-benzophenone are dissolved in 100 mass parts (MT) of a bisphenol-F-diglycidyl ether epoxy resin at 80° C. while stirring. Subsequently, the solution was degassed at 80° C. for a period of 15 minutes at 3 mbar. It can then be used for vacuum impregnation. Cross-linking conditions: 24 hours at 120° C. and 24 hours at 160° C.

EXAMPLE 2

50 MT bisphenol-F-diglycidyl ether, 50 MT of a trifunctional hydantoin epoxy resin (EZ=0.57; Araldit® XB 3084 of Ciba-Geigy AG, Basel) and 5 MT 4.4'-bis(dimethylamino)-benzophenone are mixed at 100° C. while stirring. After the 4.4'-bis(dimethylamino)-benzophenone is dissolved, the solution is degassed at 100° C. and 3 mbar for 15 minutes. The cross-linking takes place as in Example 1.

EXAMPLE 3

50 MT bisphenol-A-diglycidyl ether, 40 MT of a trifunctional hydantoin epoxy resin (see Example 2), 10 MT of an hexahydrophtalic-acid diglycidyl ester epoxy resin and 5 MT 4.4'-bis(dimethylamino)-benzophenone are processed and degassed in accordance with Example 2. The cross-linking takes place as in Example 1.

COMPARATIVE EXAMPLE A

Using a bisphenol-A-diglycidyl ether/methylhexahydrophtalic-acid anhydride impregnating resin, laminate test bodies according to the prior art were prepared. Cross-linking conditions: 90 minutes at 120° C. and 16 hours at 150° C.

The tensile strength (in N/mm$^2$) of the composite laminate materials was determined according to DIN 54 455. The resulting data is set forth in the following table. From this can be seen an increase in tensile strength of as much as 60%.

|  | Example |  |  |  |
|---|---|---|---|---|
|  | 1 | 2 | 3 | Comp. A |
| Resin Matrix | 74 | 90 | 89 | 63 |
| Laminate with Fabric A | 480 | 495 | 490 | 440 |
| Laminate with Fabric B | 660 | 780 | 775 | 500 |

The higher composite material strength is also found from splitting-force measurements (performed according to DIN 53 463). The following values were obtained:

| Laminates according to example: | (1) | (2) | (3) | Comp. A |
|---|---|---|---|---|
| Splitting force in N: | 2800 | 3350 | 3270 | 2000 |

From data obtained from the bending tests (which were conducted according to DIN 53 452), values for the modulus of elasticity (in N/mm$^2$) were calculated. As can be seen from the following data, the modulus of elasticity is increased by as much as 100%.

| Example: | (1) | (2) | (3) | Comp. A |
|---|---|---|---|---|
| Matrix: | 3,640 | 4,000 | 4,160 | 4,160 |
| Laminate: | 26,350 | 34,500 | 30,670 | 16,300 |

Because of the high values of the modulus of elasticity of the composite materials and because of the low density of the reinforcement fibers used (1.4 g.cm$^{-3}$, as compared to glass fibers with 2.5 to 3 g.cm$^{-3}$), high values are also obtained for the specific modulus of elasticity in the composite materials prepared in accordance with the invention. The specific modulus of elasticity is defined as the quotient of the modulus of elasticity and the density. The composite materials also exhibit high dielectric strength. Thus, measurements of the dielectric strength on tube sections (diameters: 76/94 mm; length: 50 mm) show values between 50 and 70 kV/cm.

The test results further indicate that with the composite materials prepared in accordance with the invention, the strength level is determined less by the intrinsic strength of the matrix systems than by the better adhesion of the matrix to the fiber.

To the epoxy resins of the type mentioned above can also be added aliphatic compounds such as hydrogenated bisphenol-A and bisphenol-F-diglycidyl ethers.

What is claimed is:

1. A process for the manufacture of a composite material comprising:
   impregnating a synthetic polymer reinforcing fiber material with an epoxy resin or epoxy resin mixture; and,
   anionically polymerizing the epoxy resin or epoxy resin mixture with an aromatic tertiary amine anionic polymerization catalyst of the formula

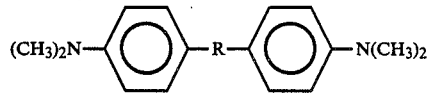

wherein R is =CHOH, =CO, =CS, —O—, —S—, =SO$_2$, =CHC$_6$H$_5$, =C(OH)C$_6$H$_5$, =CHC$_6$H$_4$(p)N(CH$_3$)$_2$, or =C(OH)C$_6$H$_4$(p)N(CH$_3$)$_2$.

2. The method of claim 1 wherein from 0.05 to 10.0 mass parts of catalyst per 100 parts of epoxy resin are used.

3. The method of claim 1 wherein from 0.1 to 5.0 mass parts of catalyst per 100 parts of epoxy resin are used.

4. The method of claims 1, 2 or 3 wherein said reinforcing fiber material is selected from the group consisting of woven fabrics, non-woven fabrics and rovings.

5. The method of claim 1, 2 or 3 wherein said reinforcing fiber material is comprised of at least one member selected from the group consisting of polyethyleneterephthalate and aromatic polyamides.

6. The method of claim 4 wherein said epoxy resin contains at least one member selected from the group consisting of bisphenol-A-diglycidylether, bisphenol-F-diglycidyl ether, polyglycidyl ethers of phenol-formaldehyde novolaks, polyglycidyl ethers of cresol-formaldehyde novolaks, hexahydrophthalic acid-diglycidyl esters, hydantoin epoxy resins, glycidylisocyanurates and urazol epoxys.

7. The method of claim 5 wherein said epoxy resin contains at least one member selected from the group consisting of bisphenol-A-diglycidylether, bisphenol-F-diglycidyl ether, polyglycidyl ethers of phenol-formaldehyde novolaks, polyglycidyl ethers of cresol-formaldehyde novolaks, hexahydrophthalic acid-diglycidyl esters, hydantoin epoxy resins, glycidylisocyanurates and urazol epoxys.

8. The method of claim 4 wherein said epoxy resin contains bisphenol-F-diglycidyl ether.

9. The method of claim 5 wherein said epoxy resin contains bisphenol-F-diglycidyl ether.

10. The method of claim 4 wherein said epoxy resin comprises a hydantoin epoxy resin.

11. The method of claim 5 wherein said epoxy resin comprises a hydantoin epoxy resin.

12. The method of claim 4 wherein said epoxy resin comprises a hexahydrophthalic acid-diglycidylester.

13. The method of claim 5 wherein said epoxy resin comprises a hexahydrophthalic acid-diglycidylester.

14. The product of the method according to claims 1, 2, or 3.

15. The product of the method according to claim 4.

16. The product of the method according to claim 5.

17. The product of the method according to claim 6.

18. The product of the method according to claim 7.

19. The product of the method according to claim 8.

20. The product of the method according to claim 9.

21. The product of the method according to claim 12.

22. The product of the method according to claim 13.

* * * * *